United States Patent

Johansson et al.

[15] 3,645,570
[45] Feb. 29, 1972

[54] COUPLING THREAD FOR PERCUSSION DRILL RODS

[72] Inventors: Ernst Lennart Johansson; Karl Lennart Gosta Lumen; Hans Per Olof Lundstrom, all of Sandviken, Sweden

[73] Assignee: Sandvikens Jernverks Aktiebolag, Sandviken, Sweden

[22] Filed: Aug. 12, 1970

[21] Appl. No.: 63,212

[30] Foreign Application Priority Data

May 4, 1970 Sweden..............................6,062/70

[52] U.S. Cl..............................287/117, 287/125, 285/334
[51] Int. Cl.................................................F16b 7/00
[58] Field of Search...................287/117, 125; 285/334, 390, 285/355; 85/46

[56] References Cited

UNITED STATES PATENTS

| | | | |
|---|---|---|---|
| 3,388,935 | 6/1968 | Hjalsten et al. | 287/117 |
| 2,206,166 | 7/1940 | Dunn | 285/334 X |
| 3,355,192 | 11/1967 | Kloesel, Jr. et al. | 85/46 X |

Primary Examiner—Andrew V. Kundrat
Attorney—Pierce, Scheffler & Parker

[57] ABSTRACT

In a connection between two threaded sections of percussion drill rods held together by a threaded coupling sleeve, the rod threads and sleeve threads have—in longitudinal section—straight flank portions and straight (or only slightly curved) top and bottom portions, the flank portions being connected by curved portions. In coupled state, there is abutting contact (between rod and sleeve threads) only as regards the straight flank portions.

3 Claims, 7 Drawing Figures

Fig. 1
Fig. 2
Fig. 3
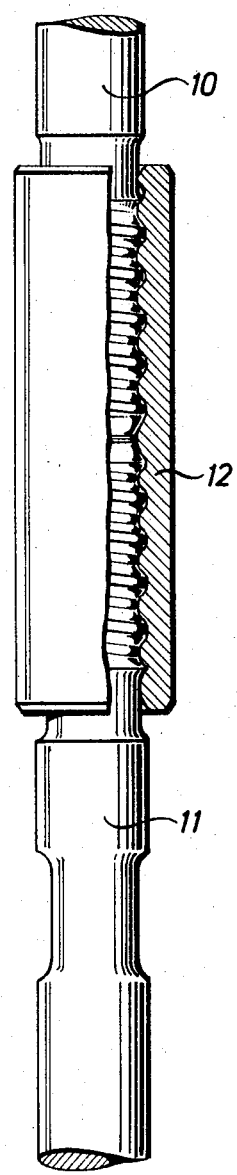
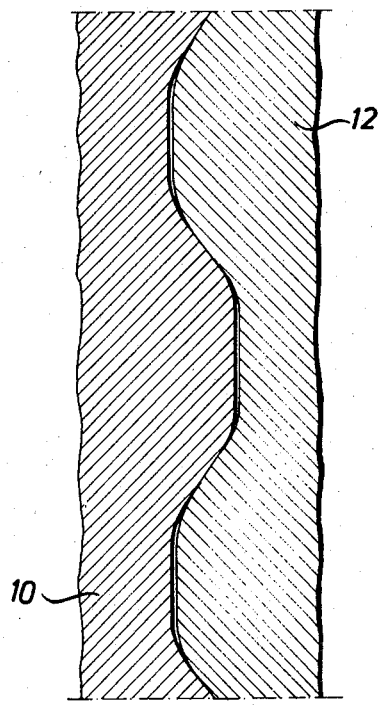
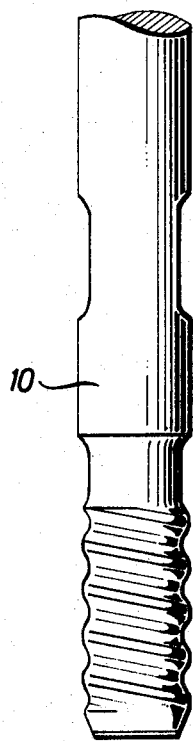

COUPLING THREAD FOR PERCUSSION DRILL RODS

The present invention relates to percussion drill rods, and is concerned with the provision of a coupling thread for percussion drill rods which makes possible a firm connection between the rods, while at the same time the threaded connection is easy to unscrew.

The invention will be described hereinbelow, with reference to the appended drawing, in which:

FIG. 1 represents a drill rod joint, according to the invention, comprising two rod ends and a coupling sleeve;

FIG. 2 is an enlarged detail showing of the joint illustrated in FIG. 1;

FIG. 3 shows a rod end with a thread according to the invention;

Figure 4:
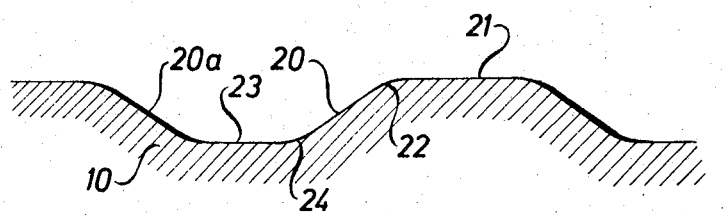
FIG. 4 is a detailed view of a rod thread according to the invention.
Figure 5:
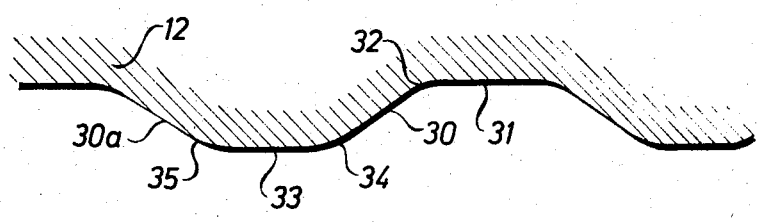
FIG. 5 is a detailed view similar to FIG. 4 but showing a sleeve thread according to the invention.
Figure 6A:
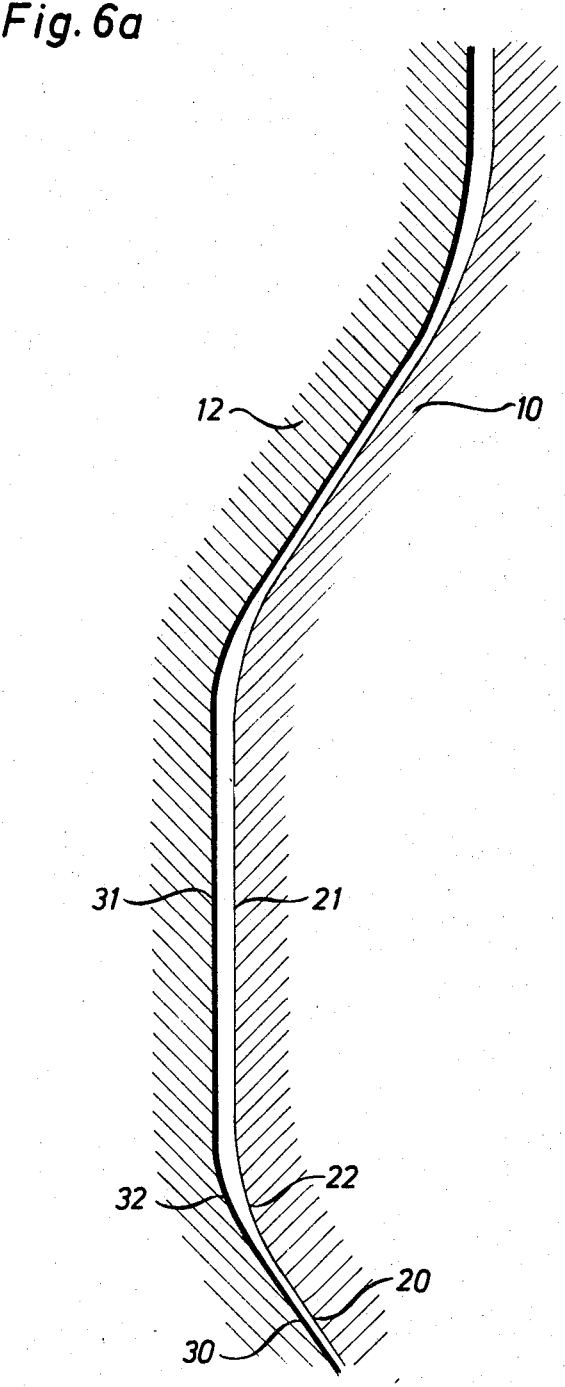
FIG. 6a and FIG. 6b show enlarged longitudinal sections of the contour of the threads in a joint according to the invention.
Figure 6B:
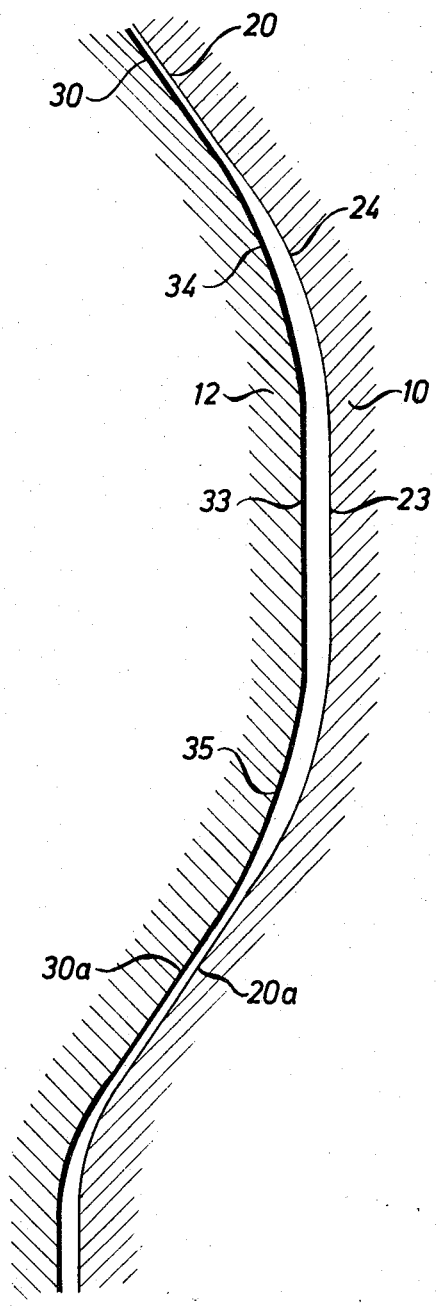

The threaded rod ends 10 and 11 shown in FIG. 1 are held together by a threaded sleeve 12, which is shown partly cut away. FIGS. 4 and 5 show, in a larger scale, a longitudinal section of both threads separately. FIG. 6a and FIG. 6b show a longitudinal section of the two threads together on a still larger scale, the two thread profiles being shown somewhat spaced from each other in order that the drawing shall be clear. FIG. 2 shows the two threads together, on the same scale as in FIGS. 4 and 5.

The thread of rod 10 has in longitudinal section a straight flank portion 20, and the sleeve thread 12 has a corresponding straight flank portion 30. Both threads have, in longitudinal section, straight or only somewhat curved tops and bottoms marked 21 and 23, respectively, for the rod thread and 31 and 33, respectively, for the sleeve thread. These straight portions adjoin the straight flanks by curved portions 22 and 24, respectively, on the rod thread and 32 and 34, respectively, on the sleeve thread.

The threads are so shaped that when they are screwed together abutting contact arises only between the straight flank portions 20 and 30 but not between the curved portions or between the tops and bottoms. The reason for this is that it is desired to avoid or minimize abutting contact between portions the profiles of which form only a small angle to the drill axis, as this latter relationship would result in the threads being wedged together in use. By the contact at a straight portion having a relatively great angle to the drill axis this wedging is eliminated. In addition, there is obtained a more even distribution of the contact pressure between the flanks. It has been found that the inclination of the longitudinal profile of the flanks 20 and 30 should be $35°_{-10°}^{+5°}$ to the drill axis. In addition the thread pitch angle should be 6.5°–9°, usually 7°–9°. A suitable value is about 8°.

Abutment is of course established only between the thread flanks that are pressed together when the joint portions consisting of threaded rod ends and threaded coupling sleeve are screwed together. Such abutment in the illustrated example occurs in the flanks 20 and 30. The opposite flanks 20a and 30a will not abut.

The purpose with the curved intermediate portions is to eliminate starts for fatigue ruptures. The radius of curvature of the portion 22 adjacent the top of the abutting flank 20 on the rod thread and the radius of the adjoining portion 32 on the sleeve thread may be smaller than the radius of the portions 24 and 34 at the other side of the abutting flanks, the fatigue stresses being less dangerous in the sleeve because of its greater cross section. Thus, the flank is made to be as long as possible.

The radius of curvature of the portions 22 and 32 suitably may be equal, at the same time as the portion 22 has its center of curvature somewhat closer to the flank, thereby ensuring that the curved portions do not touch each other. The radius of the portion 34 may be somewhat greater than the radius of portion 24, in order to make sure that contact is avoided between the threads at the inward angle at the bottom of the rod thread. In order to achieve this, the center of curvature of the portion 34 should, at the same time, lie further from the drill axis compared with the portion 24. The ratio between the radius for the portions 34 and 24 may be 1.1–1.5, and preferably is about 1.3.

A purpose for this difference between the radius of the portions 24 and 34 is to avoid contact between the curved portions in order to eliminate the risk of injuries at the bottom of the rod thread. It is desired to concentrate possible friction injuries on the rod thread to the tops thereof.

For the same purpose the rod thread is given a somewhat greater height than the sleeve thread so that the play between the bottom of the rod thread and the top of the sleeve thread is greater than between the top of the rod thread and the bottom of the sleeve thread.

A further feature for eliminating the risk of contact at the bottoms of the rod threads is to give the top of the sleeve thread an especially great radius at the flank—which latter does not take any pressure when the threads are screwed together. Thus, the radius of the portion 35 in FIG. 5 may advantageously be greater than the radius of the portion 34 and have its center of curvature further from the drill axis.

Certain of the above-mentioned conditions for the flanks,—for instance the flank inclination,—refer in the first place to the flanks which are pressed together when the threads are screwed together. For the other flanks, 20a and 30a and adjoining curved portions, the shape is or may be more free. It is, however, often suitable that both flanks of the thread ridge are—at least, in the main—symmetrical with regard to the inclination of the flank.

The described form of the thread connection achieves not merely the aforesaid advantages but also the result that the space between the threads becomes as small as possible, thus counteracting the intrusion of cuttings into the joint.

Suitable practical dimensions for a thread joint, in the case of a drill rod with 1½ inch diameter, include the following:

Inclination 35° to the axis of both the abutting and nonabutting flanks. Pitch angle 8°. Radii of curvature as follows:

| Portion n:o | Radius of curvature |
| --- | --- |
| 22 | 2 mm. |
| 32 | 2 mm. |
| 24 | 3.5 mm. |
| 34 | 4.5 mm. |
| 35 | 6 mm. |

Height of the sleeve thread: 2.25 mm. Height of the rod thread: 2.30 mm.

It is to be understood that the percussion drill rod joint of the present invention consists of one threaded drill rod, a threaded coupling sleeve and either a second threaded percussion drill rod or a threaded drill bit or other threaded member similar thereto.

We claim:

1. Thread joint for percussion drill rods comprising a rod thread and a coupling sleeve thread, the threads having one start and both the rod and sleeve thread having in longitudinal section substantially straight tops and bottoms, the improvement according to which both threads are cylindrical and have flanks that along their whole abutting contact portion are straight and adjoin straight top and bottom portions by portions that are curved in longitudinal section, the abutting flanks being inclined $35°_{-10°}^{+5°}$ to the drill axis, and the pitch angle of the thread being 6.5°–9°, the curved portion at the bottom of the abutting flank of the rod thread having a smaller radius than that of the adjoining curved portion of the top of the sleeve thread.

2. Thread joint for percussion drill rods comprising a rod thread and a coupling sleeve thread, the threads having one start and both the rod and sleeve thread having in longitudinal section substantially straight tops and bottoms, the improvement according to which both threads are cylindrical and have flanks that along their whole abutting contact portion are straight and adjoin straight top and bottom portions by portions that are curved in longitudinal section, the abutting flanks being inclined $35°_{-10°}{}^{+5°}$ to the drill axis, and the pitch angle of the thread being $6.5°-9°$, the curved portion at the top of the nonabutting flank of the sleeve thread having a greater radius of curvature than that of the curved portion at the top of the abutting flank of the sleeve thread.

3. Thread joint for percussion drill rods comprising a rod thread and a coupling sleeve thread, the threads having one start and both the rod and sleeve thread having in longitudinal section substantially straight tops and bottoms, the improvement according to which both threads are cylindrical and have flanks that along their whole abutting contact portion are straight and adjoin straight top and bottom portions by portions that are curved in longitudinal section, the curved portion at the bottom of the abutting flank of the rod thread having a greater radius of curvature than that of the curved portion at the top of the same flank, the abutting flanks being inclined $35°_{-10°}{}^{+5°}$ to the drill axis, and the pitch angle of the thread being $6.5°-9°$.

* * * * *